United States Patent
Hansen et al.

(10) Patent No.: US 11,979,679 B2
(45) Date of Patent: May 7, 2024

(54) CONFIGURABLE LOW RESOURCE SUBSAMPLE IMAGE MASK FOR MERGING IN A DISTORTED IMAGE SPACE

(71) Applicant: Rockwell Collins, Inc., Cedar Rapids, IA (US)

(72) Inventors: Brent Hansen, Eugene, OR (US); Michael A. Ropers, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 389 days.

(21) Appl. No.: 17/372,119

(22) Filed: Jul. 9, 2021

(65) Prior Publication Data
US 2023/0009944 A1 Jan. 12, 2023

(51) Int. Cl.
*H04N 5/272* (2006.01)
*H04N 5/265* (2006.01)
*H04N 19/132* (2014.01)

(52) U.S. Cl.
CPC ............ *H04N 5/272* (2013.01); *H04N 5/265* (2013.01); *H04N 19/132* (2014.11)

(58) Field of Classification Search
CPC ...... H04N 5/272; H04N 5/265; H04N 19/132; H04N 5/262; H04N 5/2624; H04N 5/2628; G06T 2207/10016; G06T 2207/20221; G06T 5/50
See application file for complete search history.

(56) References Cited

U.S. PATENT DOCUMENTS

| | | | |
|---|---|---|---|
| 4,954,912 A | 9/1990 | MacDonald et al. | |
| 6,151,009 A | 11/2000 | Kanade et al. | |
| 7,965,902 B1* | 6/2011 | Zelinka | G06F 16/51 |
| | | | 382/284 |
| 8,115,810 B2 | 2/2012 | Yoneji | |
| 9,438,769 B1 | 9/2016 | Fan | |
| 10,547,849 B1 | 1/2020 | Bellows et al. | |
| 10,841,586 B2 | 11/2020 | Schulze | |
| 10,965,932 B2 | 3/2021 | Salahieh et al. | |
| 2011/0015522 A1 | 1/2011 | Arditi et al. | |
| 2016/0292821 A1* | 10/2016 | Cho | G06T 7/38 |
| 2021/0084347 A1 | 3/2021 | Chen et al. | |

FOREIGN PATENT DOCUMENTS

| | | |
|---|---|---|
| EP | 0138324 B1 | 5/1988 |
| WO | 2017092592 A1 | 6/2017 |

OTHER PUBLICATIONS

European Search Report for European Application No. 22183940.0 dated Jan. 5, 2023, 32 pages.

* cited by examiner

*Primary Examiner* — Albert H Cutler
(74) *Attorney, Agent, or Firm* — Suiter Swantz IP (57) ABSTRACT

A system for merging a plurality of image sources into a single image stream defines a predistortion image mask for each source. Each mask defines a distorted image space to account for distortion in the display optics, and indicates a region or regions in the desired output image where one merge method should be used versus another (e.g., overlay vs. replace). Each source mask may have a separate level of granularity according to the requirements of the included image and corresponding distortion.

14 Claims, 7 Drawing Sheets

CONFIGURABLE LOW RESOURCE SUBSAMPLE IMAGE MASK FOR MERGING IN A DISTORTED IMAGE SPACE

BACKGROUND

Imaging systems with optics require distortion correction. In a system with multiple inputs, the sources are merged or blended together to drive the resulting image to a single display. For example, for picture-in-picture functionality in a helmet-mounted display or head worn display, it is desirable that the picture-in-picture region appear rectangular (or any arbitrary shape). The region definition in pixels is in a distorted image space. Distortion requires a mask to define the region.

Merging requires a mask that accurately represents the size and shape of the desired region in a display distorted space, while simultaneously minimizing the use of processor/field-programmable gate array (FPGA) resources.

When merging in distorted image space, the exterior of a merge mask will be a more complex function than a square, based on optical distortion. Display distortion may push, pull, or otherwise alter portions of the image in any direction that must be corrected.

Existing solutions utilize a per pixel mask indicating what decision the merge function should make on every pixel to accommodate any shape region in the distorted image space; however, a per pixel mask requires the bandwidth to access the mask at video line rate. A 1024×1024 bit mask requires the processor/FPGA to process 1.049 Mbit of data at frame rate.

Alternatively, a single bit mask per pixel may be embedded within the video stream to avoid the additional memory resources required by a stand-alone per pixel mask; for example: an additional bit may be included with each pixel for the entire frame; a least significant bit from one of the color components may be converted to a mask bit; or CG imagery includes a nonzero pixel value for the mask region where image would provide black with a value of 1 and all other values are unchanged. Each solution necessitates a compromise to image quality or transmission bandwidth.

SUMMARY

In one aspect, embodiments of the inventive concepts disclosed herein are directed to a system for merging a plurality of image sources into a single image stream. The system defines a predistortion image mask for each source. Each mask defines a distorted image space to account for distortion in the display optics, and indicates a region or regions in the desired output image where one merge method should be used versus another (e.g., overlay vs. replace). Each source mask may have a separate level of granularity according to the requirements of the included image and corresponding distortion.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for merging a plurality of image sources into a single image stream. The system defines a predistortion image mask for each source. Each mask defines a distorted image space to account for distortion in the display optics, and indicates a region or regions in the desired output image where one merge method should be used versus another (e.g. overlay vs. replace). Each source mask may have a separate level of granularity according to the requirements of the included image and corresponding distortion.

Figure 1:
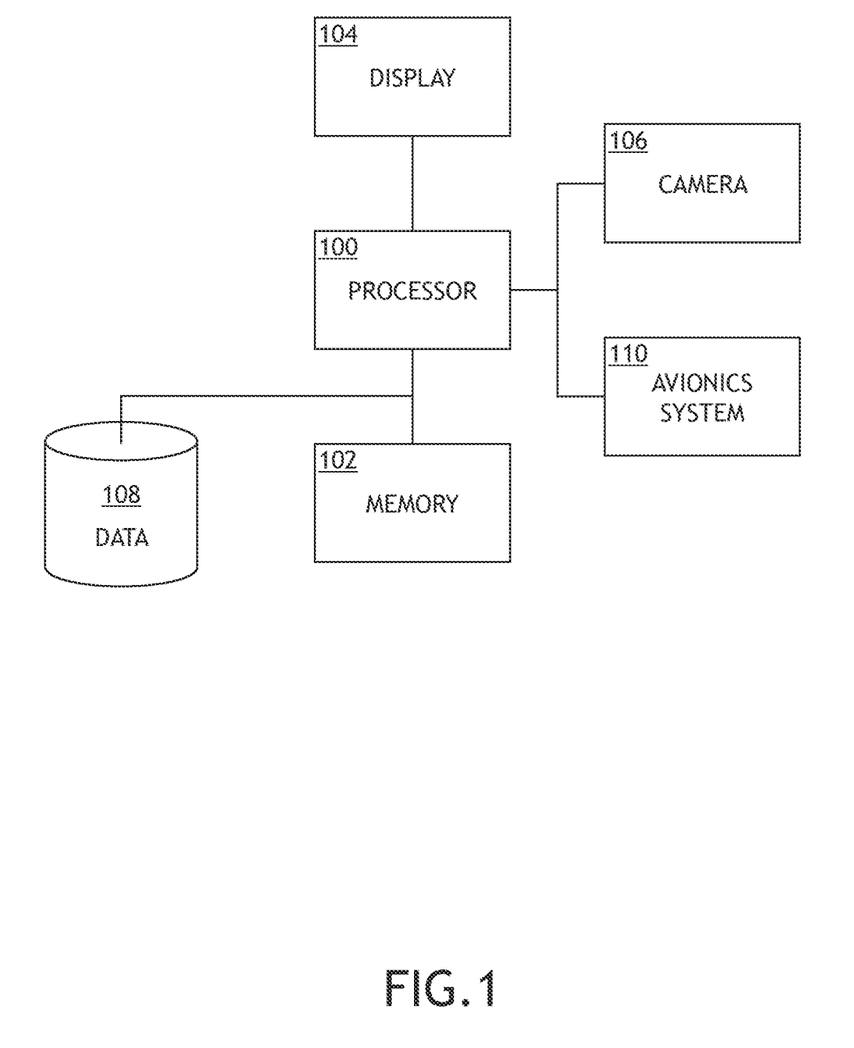
FIG. 1 shows a block diagram of a system for implementing an exemplary embodiment.

Referring to FIG. 1, a block diagram of a system for implementing an exemplary embodiment is shown. The system includes a processor 100, memory 102 connected to the processor 100 for embodying processor executable code, at least one camera 106 connected to the processor 100, and a display 104 connected to the processor 100. The processor 100 is configured to receive image streams from the cameras 106 and merge the streams into a single image to render on the display 104. The system may also include datalinks to avionics systems 110 that provide data or rendered graphics to be included in the merged image.

Cameras 106 include optical components that necessarily produce distortions in the resulting image streams; furthermore, the display optics also introduce distortions. The image streams are pre-distorted so that those optics induced distortions are mitigated upon rendering on the display. Each image source (camera 106 or rendered graphics) may require distinct pre-distortion. Furthermore, Each image source needs to be warped/distortion corrected to bring them all into the image space corresponding to the optical distortion of the display element.

A data storage element 108 stores merge masks specific to each image source, dictating a type of replacement. Each merge mask may have a distinct granularity (greater or lesser density of pixel definitions for the merge mask as more fully outlined herein).

Figure 2:
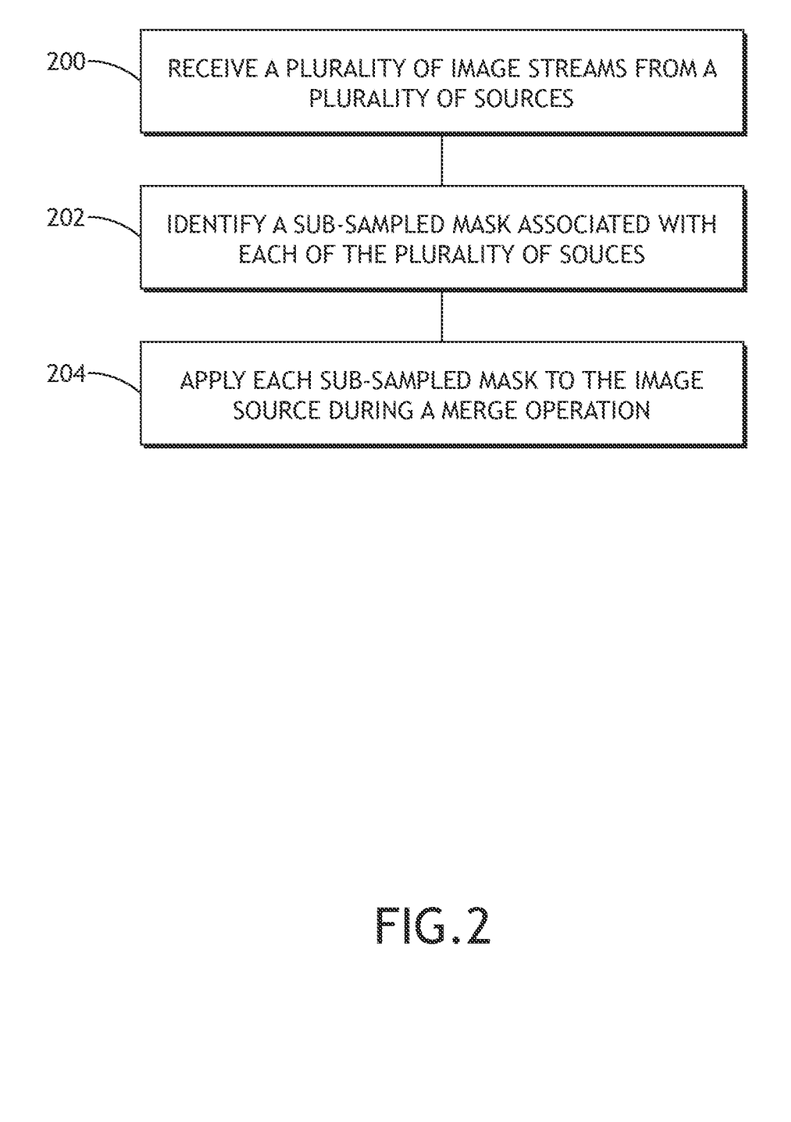
FIG. 2 shows a flowchart of a method for merging image sources in an image space.
Figure 3A:
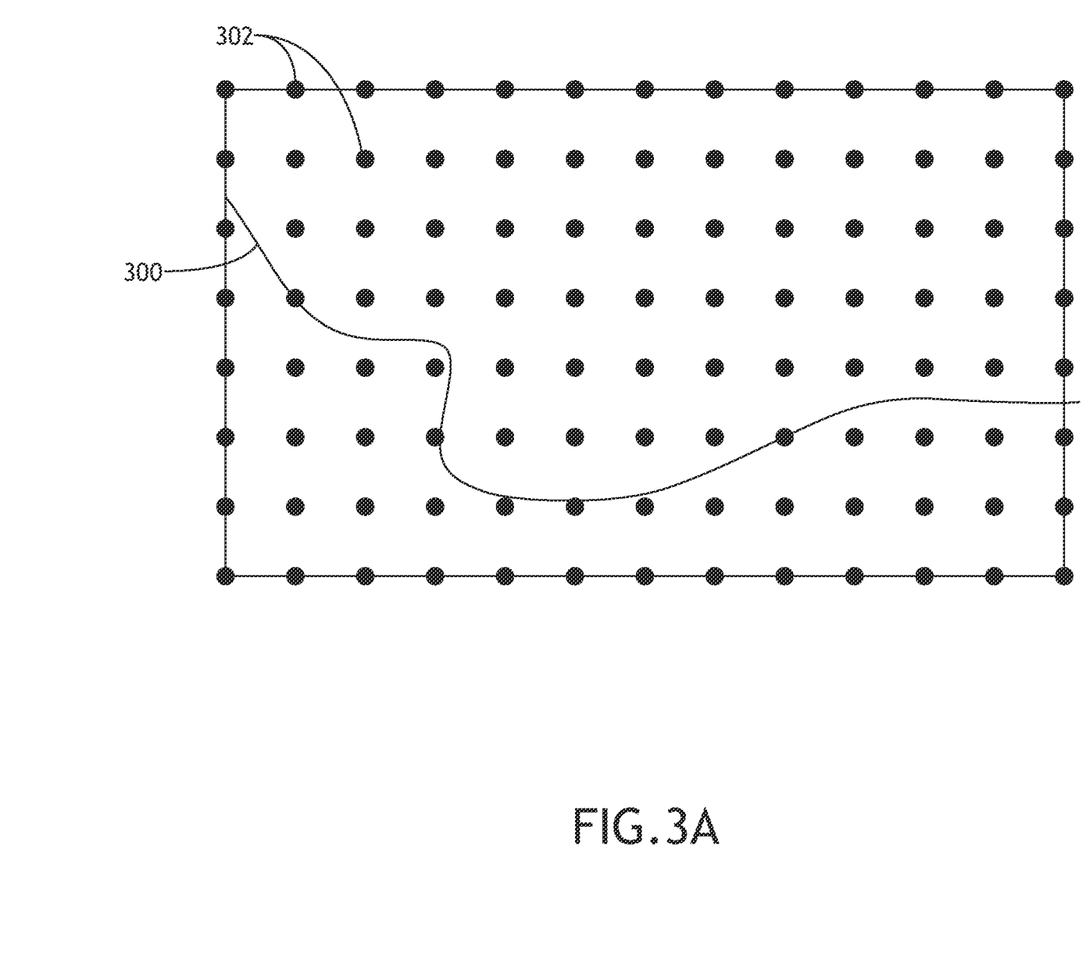
FIG. 3A shows a block representation of a tunable mask sampling grid according to an exemplary embodiment.
Figure 3B:
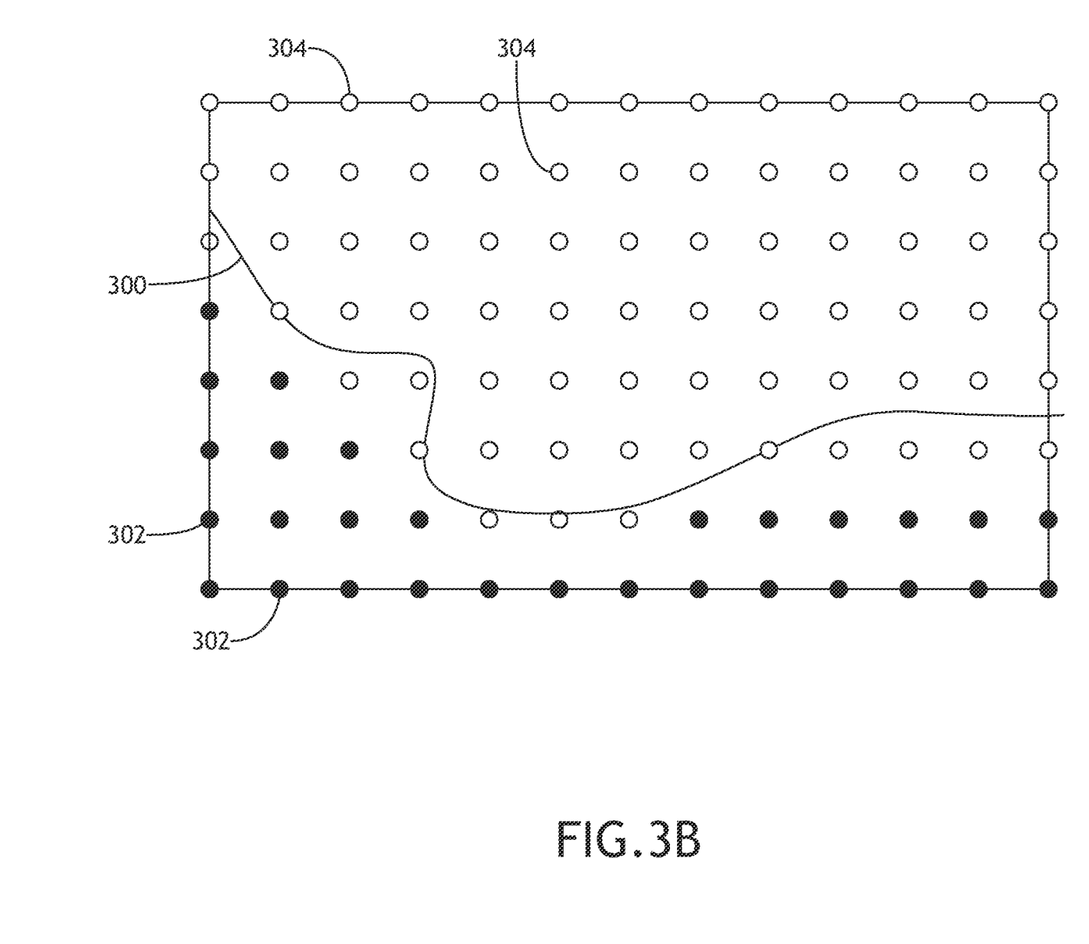
FIG. 3B shows a block representation of a tunable mask sampling grid according to an exemplary embodiment.
Figure 3C:
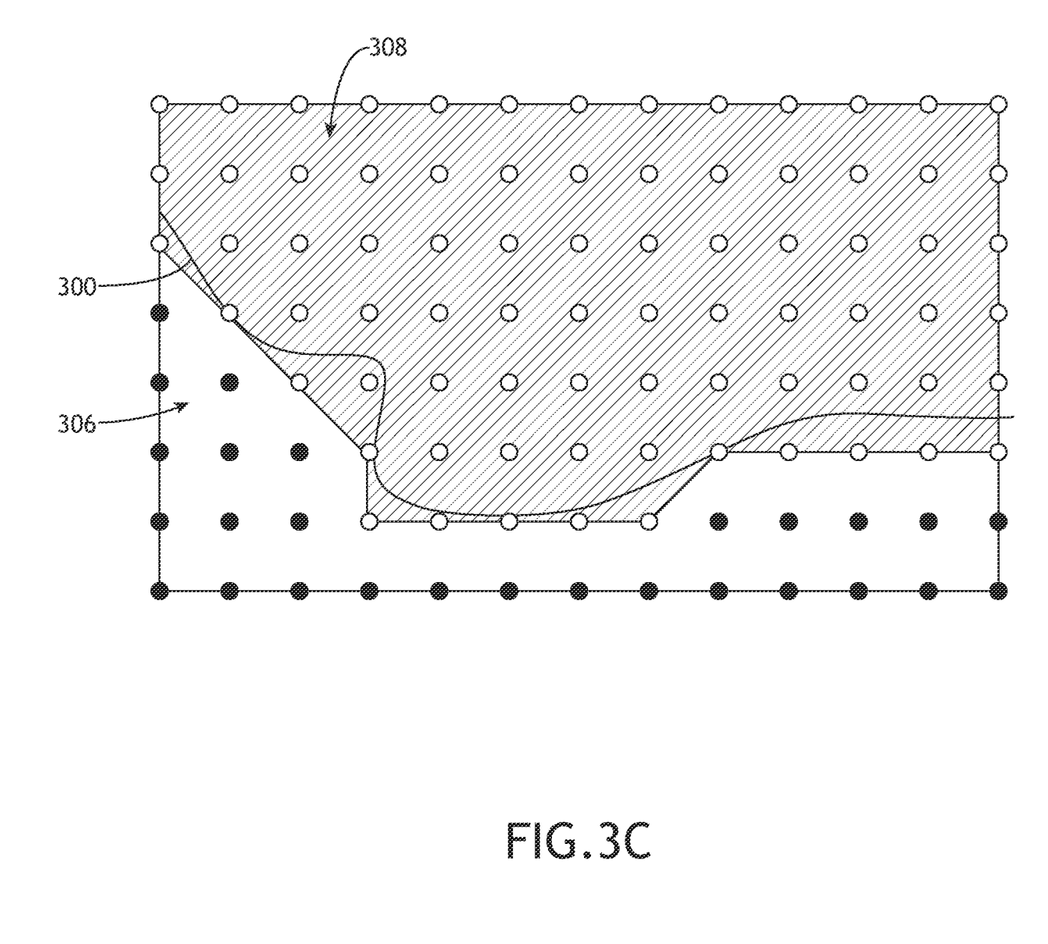
FIG. 3C shows a block representation of a tunable mask sampling grid according to an exemplary embodiment.
Figure 3D:
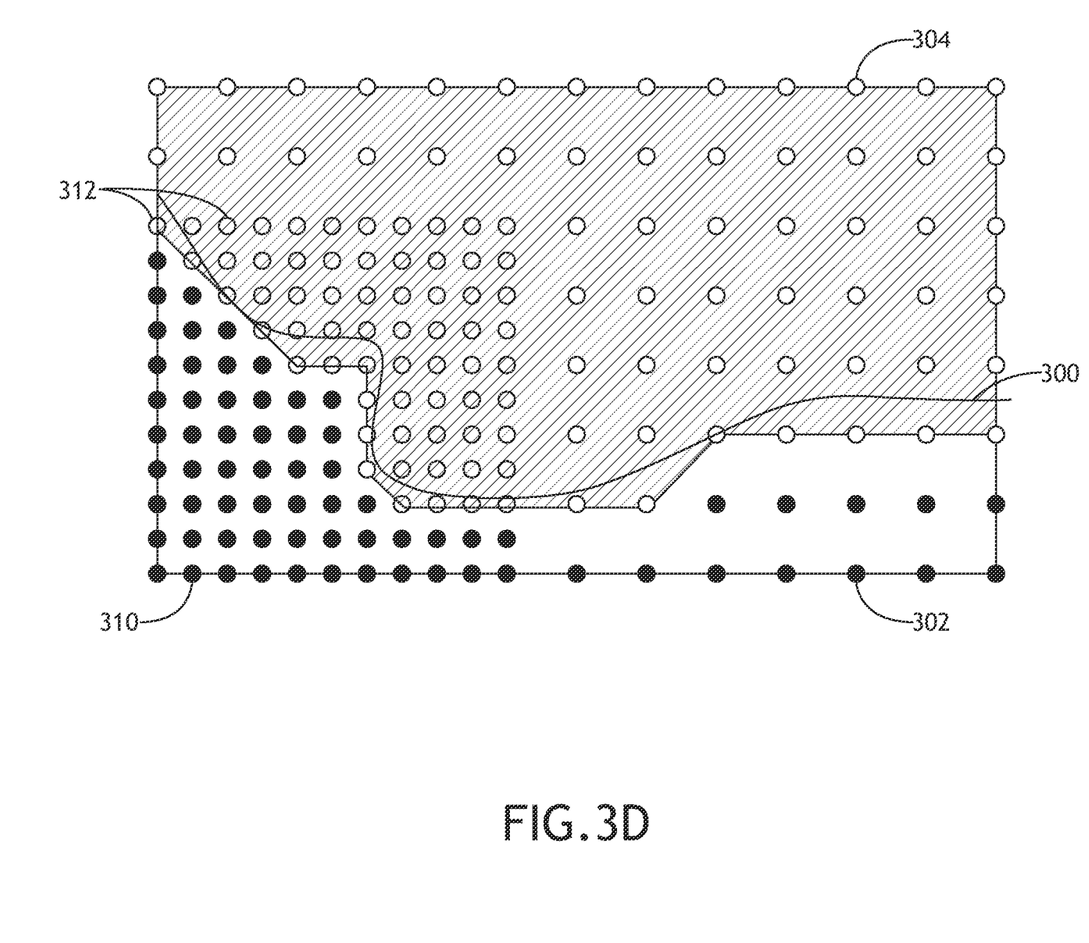
FIG. 3D shows a block representation of a tunable mask sampling grid according to an exemplary embodiment.

Referring to FIG. 2, a flowchart of a method for merging image sources in an image space is shown. An image processing system receives 200 a plurality of image streams from a plurality of image sources. Each image stream may require distinct pre-distortion based on the optics of the image source and the display source; such pre-distortion changes the shape of the image when merged with other sources. Because pre-distortion changes the shape of the image, a simple rectangular mask is insufficient when merging image streams.

The image processing system identifies 202 a mask associated with each of the plurality of image sources. Each mask comprises a sub-sampled set of nodes that define either a masked portion or an unmasked portion of the image. In at least one embodiment, four nodes define a tile that is either included in the mask, excluded from the mask, or half-included in the mask as defined by the positions of three included nodes.

In at least one embedment, portions of the mask may require a more precise fit to the actual image boundary; for example, when the image includes text or other symbology. Those portions of the mask may include a higher density of nodes than the rest of the mask to more accurately identify pixels to be included.

The image processing system applies 204 each sub-sampled mask to the corresponding image source during a merge operation, and either replaces image pixels or combines image pixels according to the definition of the corresponding mask.

Referring to FIGS. 3A-3D, block representations of a tunable mask sampling grid according to an exemplary embodiment are shown. The mask is defined by a plurality of sub-sampling nodes 302 that may be used to define blocks of pixels for a merge operation.

Where an image source is to be merged, an ideal merge operation may be defined by an ideal outline curve 300 that would define the boundary of the merge operation for every pixel. The ideal outline curve 300 is resource intensive to implement: it consumes significant bandwidth to continuously track a merge operation for every pixel. A sub-sampled merge mask defined by a plurality of sub-sampling nodes 302 indicates a "best fit" area for the merge operation with a desired granularity.

Mask defining sub-sampling nodes 304 indicate which pixels are within the mask 308 while excluded sub-sampling nodes 302 indicate which pixels are excluded and outside the mask 306. Because the sub-sampling nodes 302, 304 constitute only a small fraction of the total number of pixels, the entire mask 308 consumes substantially fewer resources than existing merger solutions. For example, in a 1024 by 1024 region using a 16 by 16 grid of sub-sampling nodes 302, 304, the mask requires only 4096 bits as compared to 1.049 Mbit of data for a per pixel mask. Resource utilization may be further limited by knowing the shape of each mask segment and applying a pre-determined merge mask tile. In at least one embodiment, such tiles may be embodied in a look-up table as more fully described herein; the processor or field-programmable gate array would not need to calculate the shape of the mask for every set of four grid points.

Some image sources, or portions of image sources, require higher granularity (a closer fit to the ideal outline curve 300). A higher granularity may be achieved with higher sub-sampling node density. However, increased sub-sampling node density increases resource utilization.

In at least one embodiment, the tunable mask sampling grid includes lower granularity (less densely spaced) sub-sampling nodes 302, 304, and higher granularity (more densely spaced) sub-sampling nodes 310, 312. Higher granularity sub-sampling nodes 310, 312 allow a closer fit to the ideal outline curve 300 with only a marginal increase in resource overhead, and only when necessary, as defined by the image source.

When merging a camera with computer generated imagery, the computer generated imagery may comprise only symbology where pixel level precision in the merger may be necessary. If the computer generated image pixel has content, it replaces the camera image pixel; if computer generated image pixel has no content, the output is the camera pixel. In such situations, the mask requires a high degree of granularity, with closely spaced sub-sampling nodes 310, 312. When the computer generated source contains imagery (for example, an image to be inset in the camera imagery for a picture in picture function), the merging function may require a merging mask to combine the two sources. This merging function can take advantage of the sub sampled merge mask.

A merge mask may indicate which portions of the computer generated image replace camera content or are replaced by camera content, and how to merge the camera and computer generated imagery sources in other areas of the output image (alpha blend, based on pixel value, etc.).

The adjustable spacing of sub-sampling nodes 302, 304, 310, 312 with greater or lesser density provides a close fit to the ideal outline curve 300 where it matters and requires fewer resources to accurately map the shape of the region overall. It may be appreciated that while exemplary embodiments described herein illustrate two separate node densities, any number of regions with different node densities may be employed as necessary based on the number and type of sources. Furthermore, the densities are not necessarily related to each other; that is to say, a higher density region is not necessarily some multiple of a lower density region.

Figure 4:
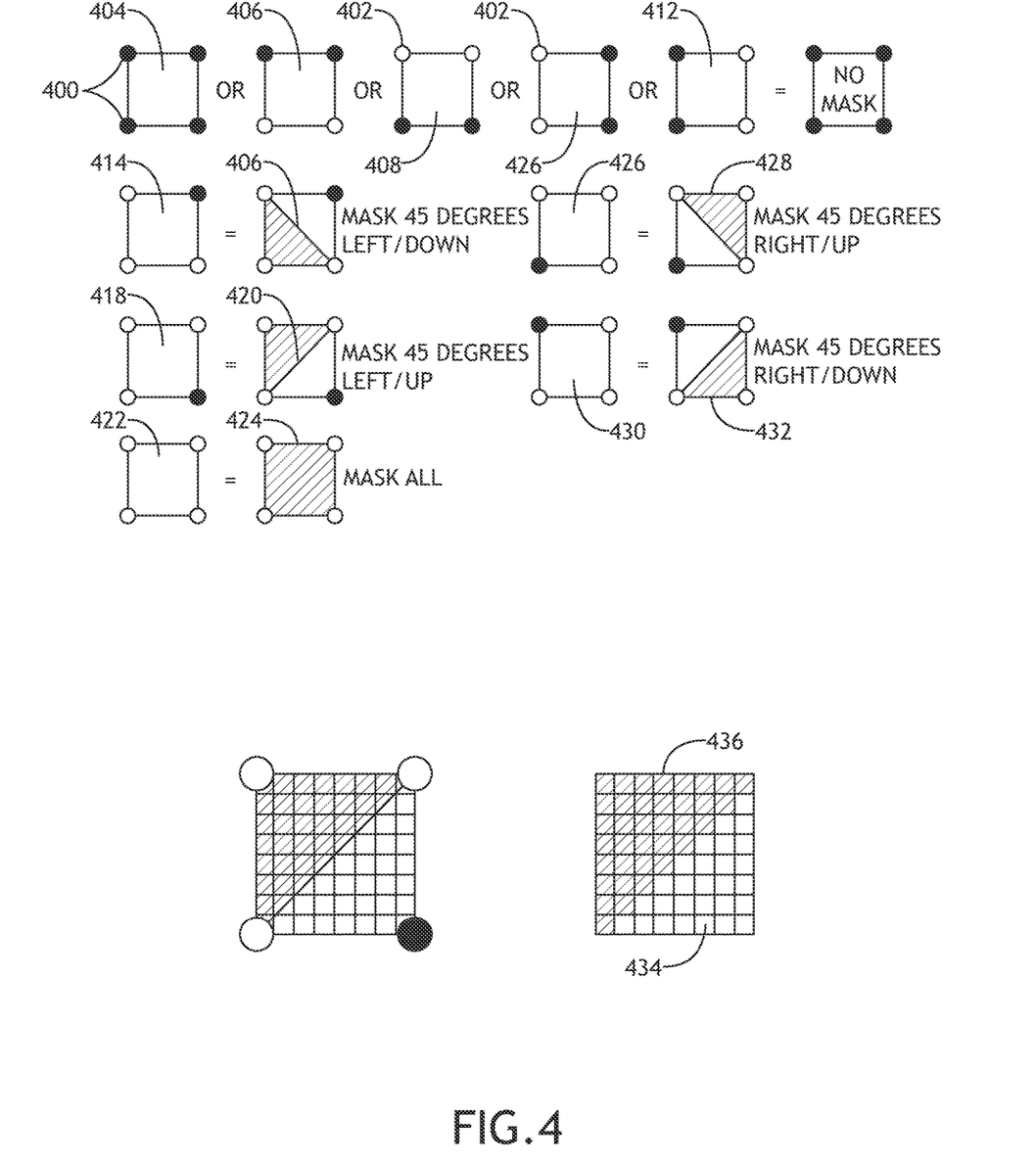
FIG. 4 shows block representations of mask tiles according to an exemplary embodiment.

Referring to FIG. 4, block representations of mask tiles according to an exemplary embodiment is shown. A lookup table may define a plurality of tiles 404, 406, 408, 410, 412, 414, 416, 418, 420, 422, 424, 426, 428, 430, 432, each defined by four nodes 400, 402. Where the nodes 400, 402 indicate a "no mask" tile 404, 406, 408, 410, 412, a processor may quickly determine that the merge mask does not include any of the pixels defined by that tile 404, 406, 408, 410, 412. Where the nodes 400, 402 indicate a "full mask" tile 424 (four mask nodes 402), the processor may quickly determine that the merge mask includes all of the pixels defined by that tile 424. Any partial tiles 414, 418, 426, 430 defined by three mask nodes 402 and one excluded node 400 indicate the mask covers pixels 436 in one half of that tile 414, 418, 426, 430 and excludes pixels 434 in the other half.

A look-up table is computationally less intensive on a processor or field-programmable gate array than calculating the mask area based on sub sample spacing and all of the nodes 400, 402. Look-up tables are easy to store, abundant, and significantly less power intensive as compared to running a multiplier in the processor fabric to generate the linear line between the merge mask sample points. Furthermore, the tiles 404, 406, 408, 410, 412, 414, 416, 418, 420, 422, 424, 426, 428, 430, 432 defined by the look-up table are scalable and independent of the density of the nodes 400, 402.

Embodiments of the present disclosure allow customization of a sub-sample mask for greater precision in areas of heavy distortion and less precision where distortion is light. Embodiments may be useful in hardware constrained applications such as helmets and head worn displays; enabling a trade-off between resource savings and accuracy error with customizable sub-sampling for a "good" fit of the original mask.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   a display device; and
   at least one processor in data communication with the display device and a memory storing processor executable code for configuring the at least one processor to:
   receive a plurality of image streams;
   identify a plurality of merge masks, each associated with one of the image streams; and
   apply each of the merge masks to the associated image stream during a merge operation,
   wherein:
      each merge mask is defined by a first plurality of regularly spaced sub-sample nodes having a first density and a second plurality of regularly spaced sub-sample nodes having second density greater than the first density;
      each merge mask defines a merge operation for the corresponding image stream; and
      applying each of the merge masks comprises:
         identifying a first set of tiles defined by the first plurality of regularly spaced sub-sample nodes;
         identifying a mask corresponding to each tile in the first set of tiles from a look-up table;
         identifying a second set of tiles defined by the second plurality of regularly spaced sub-sample nodes;
         identifying a mask corresponding to each tile in the second set of tiles from the look-up table; and
         combining the identified masks.

2. The computer apparatus of claim 1, wherein applying each of the merge masks comprises:
   identifying tiles defined by the first plurality of regularly spaced sub-sample nodes;
   identifying a mask corresponding to each tile from a look-up table; and
   combining the identified masks, and wherein the tiles form a regular tiling pattern over the image stream.

3. The computer apparatus of claim 1, wherein the first plurality of regularly spaced sub-sample nodes correspond to a first level of image pre-distortion and the second plurality of regularly spaced sub-sample nodes corresponds to a second level of image pre-distortion, the second level of pre-distortion being greater than the first level of pre-distortion.

4. The computer apparatus of claim 1, wherein each merge operation defines either a replacement or a combination.

5. The computer apparatus of claim 1, wherein at least one image stream comprises computer generated imagery.

6. A method comprising:
   receiving a plurality of image streams;
   identifying a plurality of merge masks, each associated with one of the image streams; and
   applying each of the merge masks to the associated image stream during a merge operation,
   wherein:
      each merge mask is defined by a first plurality of regularly spaced sub-sample nodes having a first density and a second plurality of regularly spaced sub-sample nodes having second density greater than the first density;
      each merge mask defines a merge operation for the corresponding image stream; and
      applying each of the merge masks comprises:
         identifying a first set of tiles defined by the first plurality of regularly spaced sub-sample nodes;
         identifying a mask corresponding to each tile in the first set of tiles from a look-up table;

identifying a second set of tiles defined by the second plurality of regularly spaced sub-sample nodes;
identifying a mask corresponding to each tile in the second set of tiles from the look-up table; and
combining the identified masks.

7. The method of claim 6, wherein applying each of the merge masks comprises:
identifying tiles defined by the first plurality of regularly spaced sub-sample nodes;
identifying a mask corresponding to each tile from a look-up table; and
combining the identified masks, and
wherein the tiles form a regular tiling pattern over the image stream.

8. The method of claim 6, wherein the first plurality of regularly spaced sub-sample nodes correspond to a first level of image pre-distortion and the second plurality of regularly spaced sub-sample nodes corresponds to a second level of image pre-distortion, the second level of pre-distortion being greater than the first level of pre-distortion.

9. The method of claim 6, wherein each merge operation defines either a replacement or a combination.

10. The method of claim 6, wherein at least one image stream comprises computer generated imagery.

11. A system comprising:
a display device;
a plurality of image stream sources; and
at least one processor in data communication with the plurality of image stream sources, the display device, and a memory storing processor executable code for configuring the at least one processor to:
receive a plurality of image streams from the plurality of image stream sources;
identify a plurality of merge masks, each associated with one of the image streams; and
apply each of the merge masks to the associated image source during a merge operation,
wherein:
each merge mask is defined by a first plurality of regularly spaced sub-sample nodes having a first density and a second plurality of regularly spaced sub-sample nodes having second density greater than the first density;
each merge mask defines a merge operation for the corresponding image source; and
applying each of the merge masks comprises:
identifying a first set of tiles defined by the first plurality of regularly spaced sub-sample nodes;
identifying a mask corresponding to each tile in the first set of tiles from a look-up table;
identifying a second set of tiles defined by the second plurality of regularly spaced sub-sample nodes;
identifying a mask corresponding to each tile in the second set of tiles from the look-up table; and
combining the identified masks.

12. The system of claim 11, wherein applying each of the merge masks comprises:
identifying tiles defined by the first plurality of regularly spaced sub-sample nodes;
identifying a mask corresponding to each tile from a look-up table; and
combining the identified masks, and
wherein the tiles form a regular tiling pattern over the image stream.

13. The system of claim 11, wherein the first plurality of regularly spaced sub-sample nodes correspond to a first level of image pre-distortion and the second plurality of regularly spaced sub-sample nodes corresponds to a second level of image pre-distortion, the second level of pre-distortion being greater than the first level of pre-distortion.

14. The system of claim 11, wherein the at least one processor is further configured to dynamically adjust the second density.

* * * * *